United States Patent [19]

Guerra et al.

[11] Patent Number: 4,935,308

[45] Date of Patent: Jun. 19, 1990

[54] COMPOSITE MATERIAL AND METHOD OF MAKING SAME

[75] Inventors: Richard J. Guerra, Hudson; Marshall, David C., Nashua, both of N.H.

[73] Assignee: Sanders Associates, Nashua, N.H.

[21] Appl. No.: 775,207

[22] Filed: Sep. 12, 1985

[51] Int. Cl.$^5$ ............................................. B32S 27/08
[52] U.S. Cl. ................................. 428/518; 428/253; 428/520; 428/911; 428/913; 2/159
[58] Field of Search ............... 428/911, 913, 520, 518; 2/159

[56] References Cited

U.S. PATENT DOCUMENTS

| | | |
|---|---|---|
| 2,153,553 | 4/1939 | Fawcett et al. |
| 2,502,841 | 4/1950 | Henderson . |
| 2,668,134 | 2/1954 | Horton . |
| 2,715,075 | 8/1955 | Wolinski . |
| 2,715,076 | 8/1955 | Wolinski . |

(List continued on next page.)

FOREIGN PATENT DOCUMENTS

| | | |
|---|---|---|
| 6559980 | 12/1980 | Australia . |
| 5837986 | 7/1985 | Australia . |
| 968689 | 6/1975 | Canada . |
| 982923 | 2/1976 | Canada . |
| 0069495 | 1/1983 | European Pat. Off. . |
| 0076366 | 4/1983 | European Pat. Off. . |
| 0123966 | 7/1984 | European Pat. Off. . |
| 0140711 | 5/1985 | European Pat. Off. . |
| 0149321 | 7/1985 | European Pat. Off. . |
| 1145088 | 10/1957 | France . |
| 1177867 | 4/1959 | France . |
| 2219002 | 9/1974 | France . |
| 714843 | 9/1954 | United Kingdom . |
| 732047 | 6/1955 | United Kingdom . |
| 1401893 | 9/1964 | United Kingdom . |
| 1011608 | 12/1965 | United Kingdom . |
| 1171123 | 11/1969 | United Kingdom . |
| 1522397 | 8/1978 | United Kingdom . |
| 1591423 | 6/1981 | United Kingdom . |
| 2113532 | 8/1983 | United Kingdom . |
| 2124551 | 11/1985 | United Kingdom . |
| 2129737 | 7/1986 | United Kingdom . |
| WO83/03205 | 9/1983 | World Int. Prop. O. . |

OTHER PUBLICATIONS

*In the Matter of an application for a patent by Henry Dreyfus, Robert Wighton Moncrieff and Charles William Sammons,* LXII, Reports off Patent, design, and Trade Mark Cases 125 (1945).

Siegel, Lee, "Hospital Gloves Found Susceptible to Leakage", In *The Boston Globe,* Oct. 26, 1988 (Boston, MA) p. 10.

Lapedes, D. N., ed. *McGraw-Hill Dictionary of Scientific and Technical Terms,* 2nd ed., (McGraw-Hill, New York 1978) p. 362.

Gammage, R. B.; Driebelbis, W. G.; White, D. A.; Vo-Dinh, T. and Huguenard, J. D., *Evaluation of Protective Garment Fabrics Challenged by Petroleum and* (List continued on next page.)

*Primary Examiner*—Edith Buffalow
*Attorney, Agent, or Firm*—Nutter, McClennen & Fish

[57] ABSTRACT

A protective material comprising a layer of vinylidene chloride or saran or copolymer of vinylidene chloride between two layers of polyethylene to provide protection against both permeation and breakthrough. A cloth backing or inner layer can be added to this material for comfort. The material can be modified with a reinforcing material such as fiberglass or scrim cloth. Inclusion of an indicator substance between layers, or impregnated in a layer, provides further protection by warning the user of permeation and breakthrough. This material can be utilized in protective clothing such as gloves, as enclosures for instruments and equipment, as a container, and in other applications. The material is preferably formed by first surface treating one or more layers of polyethylene and/or vinylidene chloride or saran with a solution comprising any hexavalent chromium compound such as a chromate or chromium trioxide in hydrogen ion such as supplied from sulphuric acid, and then pressing the layers of vinylidene chloride and polyethylene together under heat and pressure such as 330 degrees Fahrenheit at 400 PSI.

25 Claims, 1 Drawing Sheet

U.S. PATENT DOCUMENTS

| | | | |
|---|---|---|---|
| 2,801,447 | 8/1957 | Wolinski | 18/48 |
| 2,864,755 | 12/1958 | Rothacker | 204/165 |
| 2,893,908 | 7/1959 | Antlfinger | 154/139 |
| 2,897,092 | 7/1959 | Miller | 428/516 |
| 2,910,723 | 11/1959 | Traver | 18/1 |
| 2,930,106 | 3/1960 | Wrotnowski | 23/80 |
| 3,031,332 | 4/1962 | Rothacker | 427/337 |
| 3,033,707 | 5/1962 | Lacy et al. | 427/333 |
| 3,037,868 | 6/1962 | Rosser . | |
| 3,274,004 | 9/1966 | Curler et al. | 428/35 |
| 3,343,663 | 9/1967 | Seidler | 428/518 |
| 3,370,972 | 2/1968 | Nagel et al. | 428/518 |
| 3,409,198 | 11/1968 | Peterman, Sr. | 156/281 |
| 3,575,793 | 4/1971 | Paisley . | |
| 3,660,138 | 5/1972 | Gorrell . | |
| 3,739,052 | 6/1973 | Ayres et al. . | |
| 3,741,253 | 7/1973 | Brax et al. | 138/137 |
| 3,901,755 | 8/1975 | Martin et al. | 428/474.9 |
| 4,008,352 | 2/1977 | Dawes et al. | 428/518 |
| 4,112,181 | 9/1978 | Baird, Jr. et al. | 428/336 |
| 4,115,334 | 9/1978 | Gerow | 266/28.5 |
| 4,145,183 | 3/1979 | Bostwick | 427/301 |
| 4,274,999 | 7/1981 | Burley et al. | 260/45.75 |
| 4,405,557 | 9/1983 | Lehnard . | |
| 4,407,443 | 10/1983 | McCorkle | 428/916 |
| 4,421,780 | 12/1983 | Buzio et al. | 427/301 |
| 4,424,911 | 1/1984 | Resnick | 428/916 |
| 4,526,828 | 7/1985 | Fogt et al. | 428/253 |
| 4,601,783 | 7/1986 | Krulik | 427/307 |
| 4,629,636 | 12/1986 | Courduvelis et al. | 427/307 |
| 4,699,804 | 10/1987 | Miyata et al. | 427/322 |
| 4,749,084 | 6/1988 | Pereyra | 428/916 |
| 4,755,405 | 7/1988 | Massucco et al. | 428/916 |

OTHER PUBLICATIONS

*Synfuel Fluids* (United States Department of Energy, Oak Ridge, Tennessee, 1987), Report No. CONF-8701-35-2, NTIS Accession No. DE87005687.

Petersen, R. J. and Rozelle, L. T., *Ultrathin Membranes for Blood Oxygenators* (National Technical Information Service, Springfield, VA, 1974) NTIS Accession No. PB-231 324.

Petersen, R. J. and Rozelle, L. T., *Provide Ultrathin Membranes for Evaluation in Blood Oxygenators* (National Technical Information Service, Springfield, VA, 1972) NTIS Accession No. PB-211 408.

Weeks, R. W., Jr. and McLeod, M. J., *Permeation of Protective Garment Material by Liquid Benzene* (National Technical Information Service, Springfield, VA, 1980) NTIS Accession no. LA-8164-MS.

*Kirk-Othmer, Encyclopedia of Chemical Technology*, 3rd ed., vol. 16 (John Wiley & Sons, New York, 1981) p. 796.

*Hydrofluoric Acid (HF) Permeation Testing Coated and Laminated Fabrics of Tyvek ® Spunbonded Olefin,* Doc. 2194f, E. I. Du Pont de Nemours & Company, Textile Fibers Department, Wilmington, Delaware, Jan., 1984.

*Saranex Films: Fresh Ideas for Barrier Packaging,* Form No. 500-1071-85, (brochure), Dow Chemical U.S.A., Midland, Michigan, Oct., 1985.

*Supplier Information for Users of SARANEX Films,* Form No. 500-1072-85, (brochure), Dow Chemical U.S.A., Midland, Michigan.

*Kirk-Othmer, Encyclopedia of Chemical Technology*, 3rd ed., vol. 16 (John Wiley & Sons, New York, 1981) pp. 76,77 and 93-95.

*Kirk-Othmer, Encyclopedia of Chemical Technology*, 3rd ed., vol. 23, (John Wiley & Sons, New York, 1983) pp. 787-790.

*IH-244 Silver Shield TM Gloves* (Brochure), North Hand Protection, A Division of Siebe North, Inc., Charleston, SC.

Brown, W. E., "Vinylidene Chloride Polymers and Copolymers." In: *Modern Plastics Encyclopedia 1983-1984.* Oct. 1983, vol. 60, No. 10A, pp. 90-92.

COMPOSITE MATERIAL AND METHOD OF MAKING SAME

BACKGROUND OF THE INVENTION

The present invention relates to composite materials and methods of making same, and more particularly to composite materials including an addition polymer from an unsaturated monomer, and methods of making same.

Chemicals used in the electronics industry, among others, include chlorinated solvents such as 1,1,1-trichloroethane or methylene chloride, and inorganic acids, such as hydrofluoric acid and nitric acid. Accordingly, there is a need for protective clothing that will protect humans from contact with hazardous organic solvents, acids, and other chemicals.

Organic solvents of many varieties and characteristics are widely used by many industries. Many of these substances are readily absorbed through the intact skin. Widespread and profound biological dysfunctions can be produced by penetration of these substances into the body's metabolic systems. Such penetration generally occurs in two modes through any given protective material, by permeation and by breakthrough. Permeation occurs when the vapors as gaseous forms of a substance are able to pass through the protective material and become detectable on the opposite side of the membrane or material. Gaseous diffusion, therefore, delivers the substance to the skin interface, which must be protected. Once gaseous diffusion has occurred, the substance is free to penetrate and absorb through the skin barrier. Breakthrough occurs when a liquid form of a substance actually leaks through the protective material. Once through the material, the substance is then freely available for absorption through the intact skin.

Those with the development of protective materials such as gloves have long recognized the need for protection and prevention of skin contact with toxic chemicals, including aqueous solutions, caustics, acids, and organic solvents, such as are used in the electronics industry. One of the most critical problems confronting designers of protective materials such as gloves has been protection and prevention of contact with toxic chemicals which is overcome by the present invention. Gloves of prior art materials such as latex and buna rubber have been found to quickly dissolve in chlorinated solvents or to otherwise not provide the desired protection in such situations. Much of the materials available are either dissolved or penetrated in minutes. This results in inadequate protection allowing chemicals to be absorbed into the body through the skin or damaging the skin itself. The present invention fulfills the need for improved protection against skin absorption and skin contact with such chemicals.

Polyethylene has long been recognized as a desirable polymer to contain many of these chemicals Its hydrophobic nature resists wetting, particularly by aqueous solutions. One critical drawback, however, is the ability of solvent vapors to readily penetrate the polymer. Films of vinylidene chloride, polymers or copolymers (such as with vinyl chloride) of vinylidene chloride, or saran such as sold under the trademark "SARAN" have low permeation by gases and liquids, although their chemical resistance is not as good as polyethylene.

Presently available equipment, such as polyvinyl chloride (PVC) gloves or polyethylene gloves, either disintegrate when contacted by solvents (e.g., with PVC) or allow a significant amount of solvent vapor to penetrate (e.g., with polyethylene). Composite materials combining natural or synthetic rubbers with various fabrics are too cumbersome for delicate work and are expensive. Polyurethane gloves are believed to provide protection against permeation and breakthrough from organic solvents, but not for caustics and acids.

U.S. Pat. No. 3,575,793 issued Apr. 20, 1971 to G. C. Paisley appears to teach a laminate of biaxially oriented polypropylene film to a cellophane film having, on at least the surface contacting the polypropylene, a coating of saran applied from a solvent solution. U.S. Pat. No. 3,274,004 issued Sept. 20, 1966 to H. Curler, et al. appears to teach a laminate of saran-coated cellophane between layers of polyethylene with an additional outside layer of oriented polypropylene film. Neither of these references appear to show lamination of an unsupported, preformed saran film to a polyolefin layer.

SUMMARY OF THE INVENTION

Accordingly, it is a general purpose of the present invention to provide a protective material, and a method of making a protective material, which provides protection against both permeation and breakthrough.

Other objects of the present invention are to provide a protective material, and a method of making a protective material, which provides protection to a person against both liquids and vapors, which will not readily dissolve in certain acids, which provides a vapor barrier layer, which can be utilized in protective clothing such as gloves, which can be utilized in containers or enclosures such as for instruments or equipment, which is inexpensive, and which is not penetrated by common solvents and chemicals.

Further objects of the present invention are to provide a protective coating and method of making a protective coating which provides protection against skin absorption of and skin contact with chemicals, which can be reinforced, which can provide an indicator to warn the user of impending problems, and which can be provided with an inner layer for comfort.

A still further object of the present invention is to provide a method of laminating polyolefin to saran or vinylidene chloride polymers or copolymers that results in good adhesion.

Briefly, these and other objects of the invention are accomplished by a material comprising a layer of polyolefin (such as polyethylene or polypropylene) and a layer of material selected from the group consisting of saran, vinylidene chloride polymers, and copolymers (such as with vinyl chloride) of vinylidene chloride. The material of the invention is preferably formed by surface treating polyolefin layer or layers, and/or saran or vinylidene chloride polymer or copolymer layer or layers, with a solution comprising a hexavalent chromium compound and hydrogen ion, and then pressing the layers of polyethylene and saran or vinylidene chloride polymer or copolymer together under heat and pressure to form a laminate. An article of clothing or apparel, such as a glove, can be formed from this material. The material can comprise additional layers of polyolefin and/or saran or vinylidene chloride polymers or copolymers. The material can further comprise an indicator substance which can be inserted between the above layers in a separate layer, or impregnated in a layer. The indicator can be general or type specific. The material can be modified with a reinforcing material such as fiberglass or scrim cloth.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
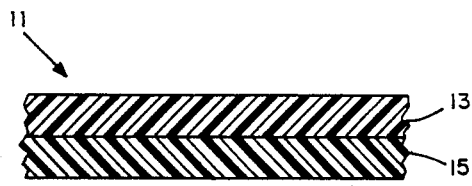
FIG. 1 is a sectional view of a laminate according to the present invention.

Referring now to the drawings, wherein like reference characters designate like or corresponding parts throughout the several views, there is shown in FIG. 1 a laminate 11 comprising a layer 13 of polyethylene laminated to an unsupported preformed layer 15 of saran, vinylidene chloride, vinylidene chloride polymer(s), or copolymer(s) (such as with vinyl chloride) of vinylidene chloride. Layer 13 and layer 15 can, for example, each be a film or sheet. Alternatively, layer 13 can be of a polyolefin such as polyethylene or polypropylene. Examples of saran are given in U.S. Pat. No. 3,031,332 issued Apr. 24, 1962 to F. N. Rothacker and in U.S. Pat. No. 3,575,793 issued Apr. 20, 1971 to G. C. Paisley, which are hereby incorporated by reference. Particular attention is directed to col. 1, lines 25-39 and col. 2, lines 61-64 of Rothacker, and col. 4, lines 10-27 of Paisley.

Following are examples of tests to form such a laminate, particularly showing the importance of surface treatment of at least one layer as disclosed below, with layer 15 utilized in each case being vinylidene chloride copolymer with vinyl chloride in the form of SARAN Wrap plastic film, and temperature and pressure readings being of approximately ±10% to 15% accuracy:

EXAMPLE 1

A 2"×2" sheet of vinylidene chloride copolymer with vinyl chloride and a 2"×2" sheet of polyethylene were cleaned by wiping with methyl ethyl ketone and pressed together, on a WABASH Press Model No. 12-12-2T having a twelve-inch platen, at 350 degrees Fahrenheit and 100 PSIG for five minutes between several sheets of TEFLON glass cloth. The TEFLON glass cloth acts as a release agent and also helps to distribute the pressure. The resulting material initially appeared to have satisfactory adhesion, but repeated folding and stretching caused the two layers to separate. Once such separation started, the two layers came apart easily. Also, the vinylidene chloride copolymer had darkened slightly and became somewhat brittle, indicating too high a process temperature or too long a dwell time at the processing temperature.

EXAMPLE 2

A piece of polyethylene sheet, and a sheet of vinylidene chloride copolymer with vinyl chloride, as in Example 1, were degreased with methyl ethyl ketone and then pressed at 325 degrees Fahrenheit at 200 PSIG for ten minutes. Press pad makeup was as in Example 1. The resulting adhesion was similar to that of Example 1.

EXAMPLE 3

One piece of polyethylene as in Example 1, and a sheet of vinylidene chloride copolymer with vinyl chloride as in Example 1, were cleaned by wiping with methyl ethyl ketone and then pressed together at 330 degrees Fahrenheit and 400 PSIG for ten minutes. Press pad makeup was as in Example 1. Resulting adhesion was similar to that of Example 1. The darkening and brittleness resulting from Example 1 did not recur. The composite tended to curl toward the polyethylene layer.

EXAMPLE 4

A composite of a piece of polyethylene, a piece of vinylidene chloride copolymer with vinyl chloride and a piece of polyehylene was laminated at 330 degrees Fahrenheit at 400 PSIG for ten minutes, using the polyethylene, copolymer of vinylidene chloride, surface preparation and pad makeup of Example 1. The resulting composite remained flat, but had adhesion similar to that of Example 1.

EXAMPLE 5

A layer of vinylidene chloride copolymer and a layer of polyethylene, as in Example 1, were surface cleaned as in Example 1. The layer of polyethylene was then treated for five minutes in a solution of 75 parts by weight of sodium dichromate, 120 parts by weight of distilled water, and 1500 parts by weight of concentrated sulphuric acid. The polyethylene was then rinsed in water and dried. The polyethylene and copolymer of vinylidene chloride were then laminated at 330 degrees Fahrenheit and 400 PSIG for ten minutes. Press pad makeup was as in Example 1. The resulting laminate tended to curl, but could not be separated by cutting or tearing. Adhesion was found to be good. A light brown color developed during lamination, but one could still see through the composite.

EXAMPLE 6

Two layers of polyethylene and one of copolymer of vinylidene chloride, as in Example 4, were cleaned as in Example 1. All three layers were then treated in the sodium dichromate solution of Example 5 and then rinsed in water and dried as in Example 5. The vinylidene chloride copolymer was then placed between the two layers of polyethylene, and the composite laminated at 330 degrees Fahrenheit and 400 PSIG for ten minutes. Press pad makeup was as in Example 1. Resulting adhesion was again found to be good, and was qualitatively judged to be better than that of Example 5. The composite did not curl, but the light brown color was again present.

Alternatively, the solution of Example 5 can include any hexavalent chromium compound such as a chromate (e.g. an alkali metal chromate, dichromate, trichromate, etc.) or chromium trioxide or chromic, dichromic or trichromic acid, and hydrogen ion such as from an inorganic acid such as sulfamic acid, sulfuric acid, or hydrochloric acid. The hexavalent chromium compound can include chromates, dichromates, or trichromates of lithium, sodium, potassium, rubidium, or cesium, or can include any soluble chromate, dichromate or trichromate. The relative proportions of chromium compound and acid should be up to saturation of the compound in the acid. The acid keeps the working solution acidic to control precipitation of hydroxides. The solution may be oxidizing the treated layer(s). A chromic acid, dichromic acid or trichromic acid may be being formed in the solution The solution can be used to treat a layer of saran or vinylidene chloride or vinylidene chloride polymer or copolymer alone, a layer of polyolefin alone, or any combination of the above Preferably, the chromium compound can be dissolved in water, and the water solution then added to the acid. This procedure improves solubility of the chromium compound, and reduces formation of chromic anhydride, which can precipitate out of the solution. The amount of water so used can be substantially an amount sufficient to dissolve the chromium compound in the water.

Alternatively, the saran or vinylidene chloride or vinylidene chloride polymer or copolymer and polyolefin can be surface cleaned or degreased with any suitable degreasing material, such as a ketone such as methyl ethyl ketone or acetone; a chlorinated organic solvent such as methylene chloride, ethylene dichloride, trichloroethylene, or 1,1,1-trichloroethane; alcohol; a fluorinated hydrocarbon solvent; an aromatic solvent such as toluene, benzene or xylene; or a soap or detergent type cleaner; or a mixture of any of the above with one or more other substances.

The solution of Example 5 can be applied by any suitable means, such as by dipping, soaking, or spraying. The solution should thereafter be removed, such as by rinsing, removing excess, squeegee, allowing to drip, or wiping.

Figure 2:
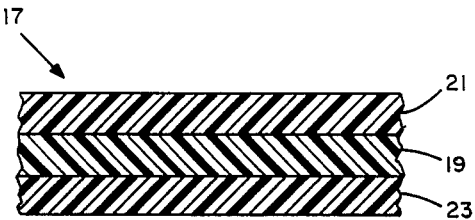
FIG. 2 is a sectional view of another laminate according to the present invention.

There is shown in FIG. 2 a preferred laminate 17 comprising a layer 19 of saran or vinylidene chloride or polymer(s) or copolymer(s) of vinylidene chloride, between layers 21 and 23 of polyethylene. This construction is preferred to that of FIG. 1 for ease of manufacture of apparel and other articles therefrom, for improved protection, and for purposes of comfort in that cling of the saran or vinylidene chloride or polymer or copolymer of vinylidene chloride to the skin is thereby avoided As an alternative to use of a platen for press lamination, the material of the invention can be produced using a roll laminator in which two or three or more individual films are fed from supply rolls, through a series of tensioning rollers, and then to heated pinch rollers for lamination. From the roll laminator, the resulting composite could then be wound to form a roll if desired.

Figure 3:
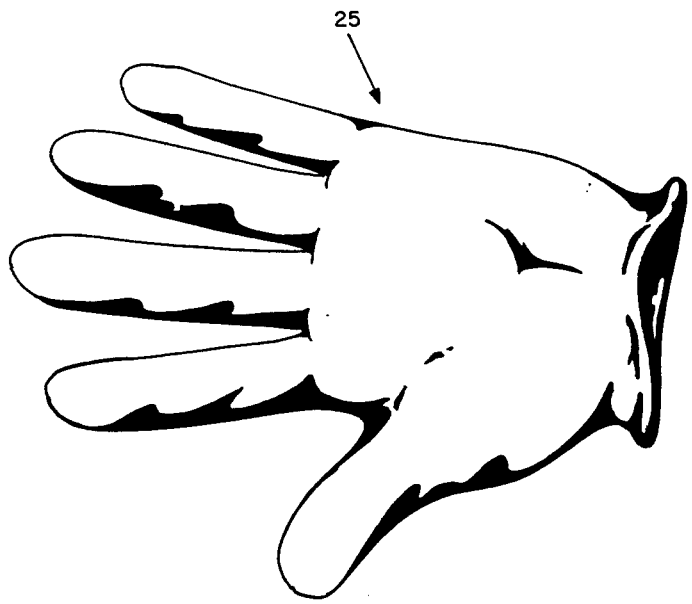
FIG. 3 illustrates a glove constructed according to the present invention.
Figure 4:
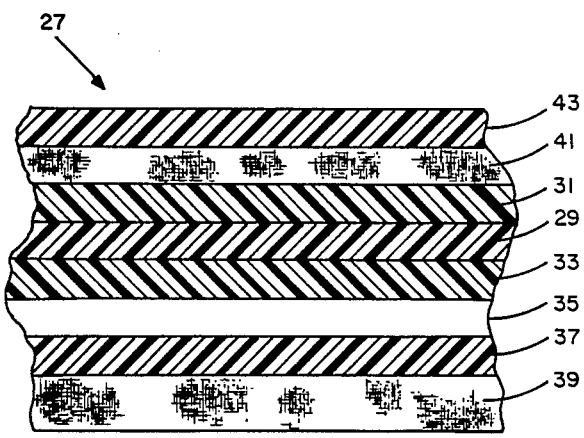
FIG. 4 is a sectional view of the material of the glove of FIG. 3.

There is shown in FIG. 3 a glove 25 according to the present invention suitable for use by a human and formed of the material 27 shown in FIG. 4, which is a cross-section of the material 27 of glove 25. Alternatively, glove 25 can be formed of the material of FIG. 1 or of the material of FIG. 2. Glove 25 can, for example, be formed by cutting such material to the desired shape, and then heat-sealing the material so cut to form a glove. Material 27 includes a layer of 29 of saran or vinylidene chloride or polymer or copolymer of vinylidene chloride between a layer 31 of polyethylene and a layer 33 of polyethylene. An indicator 35 can be placed between polyethylene layers 33 and 37; alternatively, the indicator can be placed between any two layers. A cloth backing 39 can be applied to the side of the material 37 facing the skin, for comfort and moisture absorption.

In order to incorporate a reinforcing agent, an additional reinforcing layer 41 may be provided for strength. For example, a scrim cloth 41 (such as of very coarse weave, open mesh materials) such as of fiberglass, nylon, polyvinyl fluoride, other synthetic fabric, etc., could be laminated between two layers 31, 43 of polyethylene prior to being incorporated into the composite of the invention. Alternatively, layer 41 can be of fiberglass tape.

In addition, a thin cotton or other fabric 39 can be laminated to the polyethylene layer 37 that will eventually be the inner (toward skin) layer to provide more comfort and/or absorb perspiration. Hand lotion may also be applied directly to the skin for comfort.

With a composite structure that is essentially transparent, an indicator 35 can be incorporated to warn of the penetration by general classes of materials. Indicator 35 can alternatively warn of penetration by specific species. Indicator 35 can be of paper or other absorbent material impregnated with an appropriate indicator substance. Indicator 35 can be multiply placed or encapsulated to form an array of indicator locations between layers 33 and 37, with layers 33 and 37 adhering together in some areas to separate indicator 35 within glove 25.

Ideally, indicator 35 could be incorporated into one of the polyethylene layers, but practically, it can easily be impregnated into an absorbent paper (such as litmus paper) and sandwiched between two layers 33, 39 of polyethylene prior to making the composite of the invention.

For example, to warn of aqueous or vapor phase acids or bases, an indicator such as litmus can be used. Litmus will change color, red at pH 4.5 and below and blue at pH 8.3 and above. Litmus is a water soluble material extracted from various types of lichens, such as *V. lecanora* and *V. rocella*.

One example of a specific indicator that could be used to detect hydrogen sulfide is a mixture of p-aminodimenthylanaline and ferric chloride, which reacts with hydrogen sulfide to produce a blue color.

As another example, hydroxylamine can be detected using diacetylmonoxime in the presence of a divalent nickel salt. A red complex of nickel dimethylglyoximate will result from presence of hydroxylamine. Some other materials, such as ammonium hydroxide, will also produce a red color.

Both of these reactions can be made to take place by impregnating the appropriate reagents into a paper or cloth carrier and incorporated into the composite in a manner similar to that described above for litmus.

Aldehydes, such as formaldehyde and others, can be detected by reaction with malachite green that has been decolorized with sodium sulfite. A solution of the malachite green/sulfite solution can be impregnated into filter paper or an absorbent fabric and laminated into the structure. In the presence of formaldehyde, a green color will be generated.

Iodine pentoxide in an acid medium will be oxidized to form free iodine. Iodine pentoxide can thus be used to detect benzene, toluene, and xylene. The free iodine is brown in color. The addition of starch would result in a deep blue color.

Alternatively, reinforcing layer 41 can be placed between a polyolefin layer and a layer of saran, vinylidene chloride, or vinylidene chloride polymer or copolymer. Alternatively, reinforcing layer 41 can be placed between any two polyolefin layers, or beside or as part of cloth layer 39. Alternatively, reinforcing layer 41 can be of reinforcing cloth or any suitable reinforcing material.

Alternatively, indicator 35 can be placed between an two polyolefin layers, or between a polyolefin layer and a layer of saran, vinylidene chloride, or vinylidene chloride polymer or copolymer. Indicator 35 may be present in glove 25 as a continuous layer such as impregnated in absorbent paper or cloth (such as of natural fiber). Alternatively, indicator 35 can be present only in the front and back of one finger of glove 25. Alternatively, indicator 35 can be encapsulated between two polyolefin layers, in one location or in a plurality of locations such as in a grid format.

Alternatively, in lieu of polyolefin, it may be possible to use fluorinated ethylene propylene film, or polyester film, or film of chlorinated or fluorinated polymers such as polyvinyl fluoride.

Alternatively, the present invention can be utilized as any article of apparel or clothing, as a bag, or as an enclosure or container such as for sensitive equipment. Such an item can be formed by placing the formed film of the present invention, or stacking its individual layers, onto a mold to form a particular article such as a glove. This can be done using vacuum forming techniques where the mold would be in the shape of the article, or by heating the film and pulling a vacuum (such as with a vacuum forming machine) so that the film is drawn down over the mold and takes the shape of the mold when the film is cooled. For example, the item can be so produced in sections to form a portion of a glove, such as half a glove or three-quarters of a glove. That portion would then have to be bonded to another portion of material to make a completed article. Another approach could be using a matched mold including male and female portions that fit together with appropriate space for the material of the invention. Two sheets of the material of the invention could be utilized with the mold including a split female and a solid male so that the two halves of the female came together around the male Using the two sheets of material one could form and seal the glove or other article in one step using a combination of heat and pressure or vacuum.

This composite material can be used as a cover or protection for articles If the embodiment of the material of the invention used is substantially transparent, use of such material for packaging would permit an inspector to see articles, part numbers, serial numbers, etc. without opening the package.

Thus, there has been provided a novel protective material, and a method of making a protective material, which provides protection against both permeation and breakthrough. This material and method provide protection and prevention of contact with toxic chemicals such as acids, aqueous solutions, and organic solvents. This material and method provide protection to a person against both liquids and vapors.

Obviously, many modifications and variations of the present invention are possible in light of the above teachings. It is therefore to be understood that within the scope of the appended claims, the invention may be practiced otherwise than as specifically described.

What is claimed is:

1. A protective material, comprising:
   a plurality of preformed sheets of a polyolefin;
   a preformed sheet of a first material, selected from the group consisting of vinylidene chloride homopolymers and copolymers, and any combination thereof, disposed between ones of said layers of said polyolefin and in contact with at least one of said layers of said polyolefin; and
   indicator means included within said material for indicating the presence of at least one predetermined substance.

2. A protective material, comprising:
   a plurality of preformed sheets of a polyolefin; and
   a preformed sheet of a first material, selected from the group consisting of vinylidene chloride homopolymers and copolymers, and any combination thereof, disposed between ones of said layers of said polyolefin and in contact with at least one of said layers of said polyolefin;
   wherein said polyolefin has been surface treated with a solution comprising a hexavalent chromium compound and an acid.

3. A protective material as recited in claim 2 wherein said polyolefin comprises polyethylene or polypropylene.

4. A protective material as recited in claim 2 wherein said solution further comprises water.

5. A protective material as recited in claim 4 wherein said preformed sheet of said first material has been surface treated with a solution comprising a hexavalent chromium compound and an acid.

6. A protective material as recited in claim 4, further comprising means for reinforcing said laminate.

7. A protective material as recited in claim 2 wherein said polyolefin has been surface treated by oxidation.

8. A protective material as recited in claim 2 wherein said preformed sheets of a polyolefin are each in the form of a film.

9. A laminate, comprising
   a preformed sheet of a first material selected from the group consisting of vinylidene chloride homopolymers and copolymers, and any combination thereof; and
   a polyolefin laminated to, and in contact with, said material;
   wherein said polyolefin comprises a sheet of polyethylene or polypropylene.

10. A laminate as recited in claim 9 wherein said polyolefin has been surface treated with a solution comprising a hexavalent chromium compound and an acid.

11. A laminate as recited in claim 10 wherein said solution further comprises water.

12. A laminate as recited in claim 9 wherein said first material has been surface treated with a solution comprising a hexavalent chromium compound and an acid.

13. A laminate as recited in claim 9, further comprising
   indicator means included in said laminate for indicating the presence of at least one predetermined substance.

14. A laminate as recited in claim 9 further comprising means for reinforcing said laminate.

15. A laminate as recited in claim 9 wherein said preformed sheet has been surface treated by oxidation.

16. A laminate as recited in claim 15 wherein said polyolefin has been surface treated by oxidation.

17. A laminate as recited in claim 9 wherein said polyolefin has been surface treated by oxidation.

18. A laminate as recited in claim 9 wherein said polyolefin is in the form of a film.

19. A protective material, comprising
   a plurality of preformed sheets of a polyolefin; and a preformed sheet of a first material, selected from the group consisting of vinylidene chloride homopolymers and copolymers, and any combination thereof, disposed between ones of said layers of said polyolefin and in contact with at least one of said layers of said polyolefin;

wherein said preformed sheet has been surface treated by oxidation.

20. A protective material as recited in claim 19 wherein said polyolefin has been surfaced treated by oxidation.

21. Protective apparel as recited in claim 19 wherein at least one surface of one of said layers of polyolefin has been oxidized.

22. Protective apparel as recited in claim 21 wherein at least one surface of said layer selected from the group consisting of vinylidene chloride homopolymers and copolymers, and any combination thereof has been oxidized.

23. Protective apparel as recited in claim 19 wherein at least one surface of said layer selected from the group consisting of vinylidene chloride homopolymers and copolymers, and any combination thereof has been oxidized.

24. Protective apparel as recited in claim 19 wherein said preformed sheet is selected from the group consisting of vinylidene chloride homopolymers and copolymers, and any combination thereof is in contact with a said layer of polyolefin.

25. Protective apparel as recited in claim 19 wherein said preformed sheets of polyolefin are each in the form of a film.

* * * * *